(12) United States Patent
Okamoto (10) Patent No.: US 8,434,518 B2
(45) Date of Patent: May 7, 2013

(54) CONTROL VALVE (75) Inventor: Eiji Okamoto, Tokyo (JP)

(73) Assignee: Eagle Industry Co. Ltd., Tokyo (JP)

( * ) Notice: Subject to any disclaimer, the term of this patent is extended or adjusted under 35 U.S.C. 154(b) by 604 days.

(21) Appl. No.: 12/673,986

(22) PCT Filed: Aug. 20, 2008

(86) PCT No.: PCT/JP2008/064831
§ 371 (c)(1),
(2), (4) Date: Feb. 18, 2010

(87) PCT Pub. No.: WO2009/025298
PCT Pub. Date: Feb. 26, 2009

(65) Prior Publication Data
US 2010/0282991 A1  Nov. 11, 2010

(30) Foreign Application Priority Data

Aug. 23, 2007 (JP) .................................. 2007-216924

(51) Int. Cl.
*F16K 11/07* (2006.01)
(52) U.S. Cl.
USPC ................. 137/625.69; 137/596.17; 137/597; 137/627.5
(58) Field of Classification Search ............. 137/596.17, 137/596.1, 596.2, 625.65, 625.69, 627.5, 137/115.27, 225, 510; 303/119.2
See application file for complete search history.

(56) References Cited

U.S. PATENT DOCUMENTS

| | | | |
|---|---|---|---|
| 4,442,998 A | 4/1984 | Ohyama et al. | |
| 5,234,265 A * | 8/1993 | Tyler ........................ | 303/119.2 |
| 5,771,933 A | 6/1998 | Akamatsu et al. | |
| 6,935,374 B2 * | 8/2005 | Yamamoto ................. | 137/627.5 |
| 7,159,615 B2 * | 1/2007 | Yamamoto ............... | 137/596.17 |
| 2004/0118463 A1 | 6/2004 | Yamamoto | |
| 2005/0076959 A1 | 4/2005 | Yamamoto | |

FOREIGN PATENT DOCUMENTS

| | | |
|---|---|---|
| JP | 56019371 A | 2/1981 |
| JP | 64036777-1989 | 3/1989 |
| JP | 02072881-1990 | 6/1990 |
| JP | 09222180 A | 8/1997 |
| JP | 2004197858 A | 7/2004 |
| WO | 2004072524 A1 | 8/2004 |

OTHER PUBLICATIONS

International Search Report.

* cited by examiner

*Primary Examiner* — Craig Schneider
*Assistant Examiner* — Craig J Price
(74) *Attorney, Agent, or Firm* — Harness, Dickey & Pierce, PLC (57) ABSTRACT

The control valve has a body; a supply port, an output port, and a discharge port; a first pressure-sensing device; the valve body having a first valve section surface that forms a first valve seat surface; a valve seat body having a second valve seat surface that forms the second valve section surface; a second pressure-sensing device; and a solenoid section. The first effective pressure-receiving area, the first pressure-receiving area on the inner side of a portion where the first valve seat surface and the first valve section surface are in contact with each other, and the second pressure-receiving area on the inner side of a portion where the second valve seat surface and the second valve section surface are in contact with each other are set to be substantially the same, and the second effective pressure-receiving area is set greater than the first effective pressure-receiving area.

6 Claims, 6 Drawing Sheets

CONTROL VALVE

TECHNICAL FIELD

The present invention relates to a control valve used for controlling fluid pressure, e.g. controlling pressure of a power transmission device, etc. Particularly, the present invention relates to a control valve to improve malfunction caused by unbalanced working fluid pressure which works on the valve body, malfunction related to sliding resistance when the control valve works, or delay of spring means, etc., related to fast working of the valve body, for pressure proportional control.

BACKGROUND ART

Figure 5:
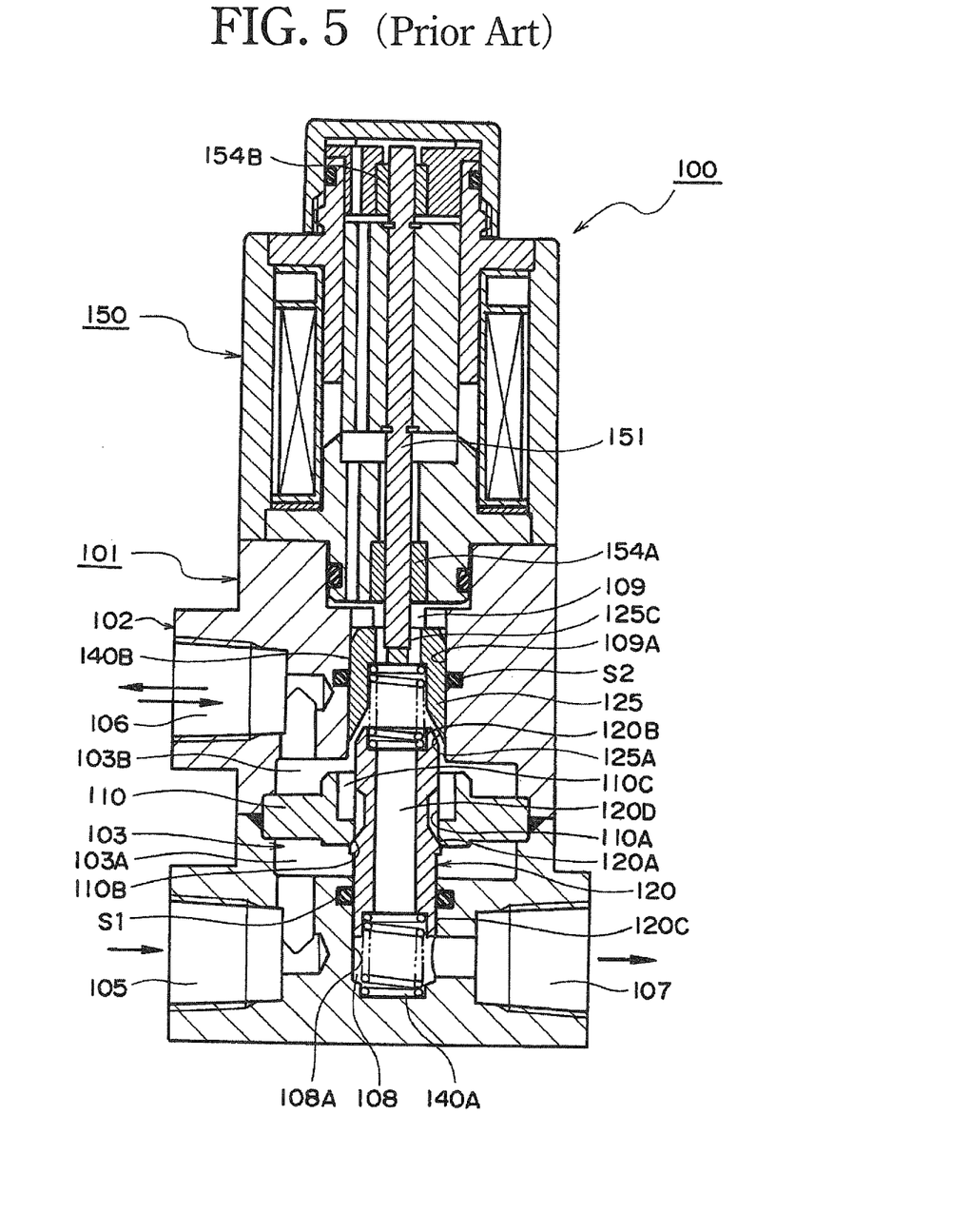
FIG. 5 is a full sectional view of a control valve of a prior art of the present invention.

As a related art of the present invention, a pressure proportional control valve is known. This pressure proportional control valve is a constitution as shown in FIG. 5 (e.g. Japanese Unexamined Patent Publication No. 2004-197858 (Patent Document 1)). This pressure proportional control valve is a three-way valve used for, for example, a drive unit of an AT (automatic transmission) car and hydraulic control system.

The constitution of this pressure proportional control valve will be explained. In FIG. 5, a pressure proportional control valve 100 is constituted by a valve main body 101 and a solenoid 150. A main body 102 forming a framework of the valve main body 101 is internally formed with a communication chamber 103. The communication chamber 103 is formed with an input port 105, an output port 106 and a discharge port 107, which communicate with the outside. Also, the communication chamber 103 is divided into a first communication chamber 103A which communicates with the input port 105 and a second communication chamber 103B which communicates with the output port 106, by a partition plate 110. At the center of the partition plate 110, a first valve bore surrounding surface 110A is formed. At the side of the first communication chamber 103A in this first valve bore surrounding surface 110A, a first valve seating surface 110B is formed. Also, at the side of the second communication chamber 103B in the first valve bore surrounding surface 110A, a plurality of passage grooves 110C are partially formed along the surrounding surface. This passage groove 110C works together with a minor diameter surface of a first valve body 120 as a fluid passage, where a working fluid runs, when a first valve surface 120A of the first valve body 120 moves away from the first valve seating surface 110B to open.

Also, in the main body 102, a first pressure chamber 108 is formed between the first communication chamber 103A and the discharge port 107. This first pressure chamber 108 is provided with a first sliding surrounding surface 108A. This first sliding surrounding surface 108A is provided with a first annular groove to fit a first seal ring S1 in. Further, in the main body 102, a second pressure chamber 109 is formed to communicate with the second communication chamber 103B. An outer circumference of the second pressure chamber 109 is provided with a second sliding surrounding surface 109A. This second sliding surrounding surface 109A is provided with a second annular groove to fit a second seal ring S2 in.

Also, the first valve body 120 provided with an outer circumference surface 120C, movably fitted with the first sliding surrounding surface 108A of the main body 102 and the first valve bore surrounding surface 110A of the partition plate 110, is arranged. An axis of the first valve body 120 is provided with a communication passage 120D communicating with the first pressure chamber 108 and second pressure chamber 109. Also, this first valve body 120 is elastically pressed to the side of a second valve body 125 by a first spring 140A arranged in the first pressure chamber 108. Also, the first valve body 120 is provided with the first valve surface 120A at the intermediate part as well as the second valve surface 120B at the apical end. Also, a second spring 140B is arranged between the first valve body 120 and second valve body 125, and the first valve body 120 and the second valve body 125 are elastically pressed by the second spring 140B in opposing direction.

Further, the second valve body 125 movably fitted with the second sliding surrounding surface 109A of the main body 102 is arranged. The second valve body 125 is cylindrically formed and provided with a second valve seating surface 125A having a tapered surface in the internal surrounding surface of one end portion of the second valve body 125. Also, an end of a solenoid rod 151 is connected to a fitting hole provided with a plurality of passages 125C along the surrounding surface of the other end portion of the second valve body 125. Both ends of the solenoid rod 151 are slidably introduced by a first bearing 154A and a second bearing 154B. Then, the solenoid rod 151 is operated according to the magnitude of electrical current flowing in the solenoid 150 to open or close the second valve seating surface 125A of the second valve body 125 with regard to the second valve surface 120B.

The operation of thus-constituted pressure proportional control valve 100 is initiated by closing the first valve surface 120A of the first valve body 120 with regard to the first valve seating surface 110B due to elasticity of the first spring 140A. Then, the working fluid running in from the input port 105 is blocked by the closing of the first valve surface 120A. Also, when the solenoid 150 works, the second valve surface 120B of the first valve body 120 and the second valve seating surface 125A of the second valve body 125 are jointed to close, and the first valve surface 120A of the first valve body 120 is separated from the first valve seating surface 110B to open. By the opening of the first valve surface 120A, the working fluid running in from the input port 105 runs out into the second communication chamber 103B. Note that in the opening/closing shown in FIG. 5, the first valve body 120 and second valve body 125 are opened, so that the working fluid runs out from the output port 106 to the discharge port 107.

Then, in the pressure proportional control valve 100, the first valve body 120 is opened/closed by sliding its outer circumference surface 120C and the first sliding surrounding surface 108A, and also slides while the first seal ring S1 provided between the sliding surfaces and the outer circumference surface 120C strongly friction. Therefore, the first valve body 120 has large sliding resistance during the opening/closing. Particularly, when the pressure of the working fluid is high, the first seal ring S1 is radially extended by this pressure to be elastically deformed, so that the first seal ring S1 slides while strongly frictioning with the cohesive first valve body 120. Therefore, the sliding resistance of the first valve body 120 becomes large, causing to lower the response performance of the opening/closing of the pressure proportional control valve 100.

Also, the outer circumference surface 120C of the first valve body 120 slides with the first sliding surrounding surface 108A. The working fluid intrudes between the sliding surfaces, so that external impurities included in the working fluid may intervene between the sliding surfaces. Therefore, the first valve body 120 pressed by the first spring 140A in which the force changes depending on the displaced position may cause delayed response during the operation. Further, this first valve body 120 is pressed to one surface, possibly causing stick phenomenon (so-called hydrolock) between the sliding surfaces. As a result, operation property of the pressure proportional control valve 100 is changed to increase hysteresis phenomenon in the relation between the pressure and amount of flow of the working fluid. Further, the constitution to simultaneously slide the first valve body 120 along to two distant axes of the first sliding surrounding surface 108A and the first valve bore surrounding surface 110A elevates the costs of assembly and processing.

Figure 6:
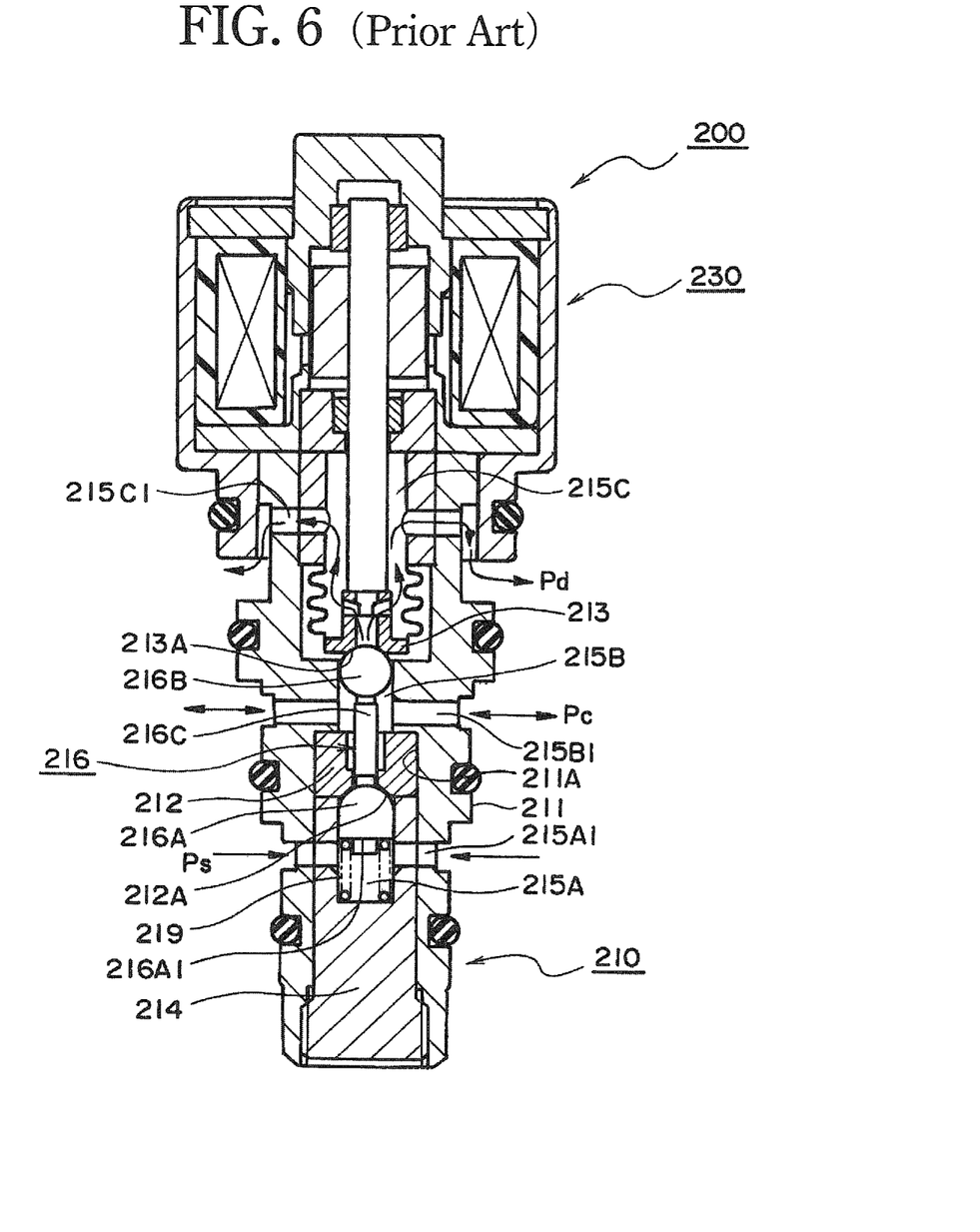
FIG. 6 is a full sectional view of a control valve of another prior art of the present invention.

Further, there is a solenoid valve as shown in FIG. 6 as a related art of the present invention (e.g. Japanese Unexamined Patent Publication 2002-295708 (Patent Document 2)). FIG. 6 shows a structure in which a valve portion 210 and a solenoid 230 are integrated. In this valve portion 210, a valve sleeve 211 is internally provided with a through-hole 211A. The through-hole 211A of the valve sleeve 211 is partitioned by a first valve seat 212, a second valve seat 213 and a screw 214 to form an inflow chamber 215A, a pressure controlling chamber 215B and an outflow chamber 215C. To the inflow chamber 215A, an inflow port 215A1 communicates. Also, to the pressure controlling chamber 215B, a pressure controlling port 215B1 communicates. Further, to the outflow chamber 215C, an outflow port 215C1 communicates.

Also, a first valve body 216A is placed in the inflow chamber 215A. The first valve body 216A is elastically pressed by a spring 219 to contact and discontact with a first valve seating surface 212A of the first valve seat 212, so that a first poppet valve is constituted. The first poppet valve is opened/closed by an interacting force between the solenoid 230 and the spring 219 to open/close a passage between the inflow chamber 215A and the pressure controlling chamber 215B. Also, a second valve body 216B is placed in the pressure controlling chamber 215B. Then, the first valve body 216A and the second valve body 216B are connected via a connecting portion 216C to constitute a connecting valve body 216 as a whole. The second valve body 216B contacts and discontacts with a second valve seating surface 213A of the second valve seat 213 to constitute a second poppet valve. The second poppet valve is opened/closed by an interacting force between the solenoid 230 and the spring 219 to open/close a passage between the pressure controlling chamber 215B and the outflow chamber 215C.

Thus-constituted valve portion 210 works as with the above-described pressure proportional control valve 100. And, according to the magnitude of electrical current flowing in the solenoid 230, the first poppet valve and the second poppet valve are opened/closed to control the working fluid. On the other hand, the pressure of the working fluid flowing from the inflow port 215A1 into the inflow chamber 215A is pressed to transport by a pump, so that the working fluid may pulse (fluctuate). The pulsing pressure flowing in from the inflow port 215A1 works on the connecting valve body 216, which may cause the connecting valve body 216 to pulse since the connecting valve body 216 is not constituted to cancel the pressure worked on its both sides to the pressure of the working fluid. Therefore, it may be difficult that the first poppet valve and the second poppet valve control the working fluid properly.

[Patent Document 1] Japanese Unexamined Patent Publication No. 2004-197858

[Patent Document 2] Japanese Unexamined Patent Publication No. 2002-295708

DISCLOSURE OF INVENTION

Problems to be Solved by the Invention

The present invention was made reflecting the above-described problems, and the problems to be solved by the invention are to decrease sliding resistance of a valve body and to improve response performance of opening/closing against application force of the valve body. In addition, the present invention aims at reducing hysteresis phenomenon of the control valve. Also, the purpose of the present invention is to decrease the sliding resistance of the valve body and to improve response performance of opening/closing of the valve body even when a working fluid is high in pressure. Further, the present invention aims at reducing the cost of processing in the control valve and the cost of assembling its parts.

Means for Solving the Problems

The present invention was made to solve the above-described technical problems, and technical means for solving the problems is as follows.

Namely, a control valve of the present invention is a control valve to control pressure of a working fluid by opening/closing a control valve portion by a solenoid portion, comprising a main body internally having a first valve chamber and a second valve chamber and having a first valve seating surface provided on a surrounding surface of a valve bore surface at a side of the first valve chamber, the valve bore surface being penetrating a partition portion provided between the first valve chamber and the second valve chamber; a supply port penetrating the main body to communicate to the first valve chamber and flowing a fluid with supply pressure; an output port penetrating the main body to communicate the second valve chamber and flowing a fluid with controlling pressure; a first bellows unit arranged in the first valve chamber and having a spring means of a cylindrical body, a periphery of one end of the cylindrical body being hermetically connected with the main body, and a second communication passage being formed in an inner side of the cylindrical body; a discharge port penetrating the main body to communicate to the second communication passage and flowing a fluid with discharge pressure; a valve body having a first valve portion surface connecting to a periphery of other end of the cylindrical body of the first bellows unit to communicate the second communication passage to a first communication passage formed in the valve body at one end of the valve body, the first valve portion surface being contacting and discontacting with the first valve seating surface to configure a first poppet valve, a fuselage portion movably arranged in the valve bore surface and forming a first flow passage communicatable with the supply port between the valve bore surface and said fuselage portion, and a second valve portion surface formed integral with the fuselage portion and arranged in the second valve chamber; a valve seat body having a second valve seating surface provided in a corner portion of an inner circumference surface facing to the second valve portion surface of the valve body to constitute a second poppet valve by contacting and discontacting the second valve seating surface with the second valve portion surface, and a first internal passage in the inner circumference surface communicatable with the first communication passage; a second bellows unit arranged in the second valve chamber and having a spring means of a cylindrical body, an end periphery of the cylindrical body being connected with the main body, the other periphery of the cylindrical body being hermetically connected with the valve seat body, and the second bellows unit being provided with a second internal passage communicatable with the first internal passage; and a solenoid portion having a solenoid rod passing through the second internal passage to connect with the valve seat body, and moving the solenoid rod according to magnitude of electrical current; wherein a first effective pressure receiving area of the first bellows unit, a first pressure receiving area which receives fluid pressure in an interior portion in which the first valve seating surface and first valve portion surface are jointed and a second pressure receiving area which receives fluid pressure in an interior portion in which the second valve seating surface and second valve portion surface are jointed are nearly equally formed, and a second effective pressure receiving area of the second bellows unit is formed to be larger than the first effective pressure receiving area.

According to thus-constituted control valve, the first pressure receiving area and the first effective pressure receiving area are approximately same pressure receiving areas, so that unbalanced force can be prevented (opposite force of pressure working on the valve body is cancelled) even when supply pressure works on the valve body. As a result, opening/closing of the valve body unaffected by the supply pressure can control the fluid with controlling pressure as a setup value. Further, since the valve body does not fluctuate due to the supply pressure, it is possible to prevent abrasion on the joint surface of the first poppet valve. Also, the valve body, in which the first pressure receiving area and the first effective pressure receiving area are same in area, can tandemly be supported by the first bellows unit having approximately same diameter. As a result, it is unnecessary to introduce the valve body by the main body, resulting in simplifying the valve structure to reduce the cost. Also, the first bellows unit and the second bellows unit working with the valve body and the valve seat body have no sliding surface with opposing components, so that it is possible to prevent causing malfunction due to adherence of impurities included in the working fluid on a sliding surface during the operation. Also, since the first bellows unit and the second bellows unit combine spring means and flow passage for the working fluid, the structure of the main body and valve body can be simplified, and production cost can be largely reduced.

Preferably, in the control valve of the present invention, the second bellows unit comprises the spring means pressing the valve seat body to the valve body, and the solenoid portion is constituted to move the solenoid rod in a direction away from the valve body according to magnitude of electrical current to open the valve seat body with respect to the second valve portion when applying electrical current to the solenoid portion and to close the valve seat body with regard to the second valve portion when blocking electrical current to the solenoid portion.

According to thus-constituted control valve, the second bellows unit is elastically supported, so that the valve seat body can stably be held as opposing to the valve body. Therefore, the valve seat portion and the second bellows unit require no guide for horizontal oscillation, and allow stably supporting against the pressure of the solenoid rod. Therefore, even when impurities included in the fluid are adhered, it is possible to effectively prevent increase in sliding resistance of a sliding surface due to impurities since there is no sliding surface. Also, thus-constituted control valve has a constitution such that a second poppet is urgently closed when electric current flowing in the solenoid portion is accidentally blocked, so that the working fluid of the controlling machine is not discharged, and it is possible to prevent malfunction in a controlling machine by discharge of the working fluid.

Note that the pressing direction of the spring means or the direction of movement of the solenoid rod in the solenoid portion can properly be selected according to conditions of use for the other side to which the control valve is used, and is not limited to any specific direction.

Also preferably, in the control valve of the present invention, the valve seat body has a cylindrical portion at a side surface of an inner circumference of the valve seat body, and the cylindrical portion is loosely fitted with an inner circumference surface of the second bellows unit.

According to thus-constituted control valve, the cylindrical portion is formed in the inner circumference side of a flange portion of the valve seat body, and in a corner portion of the inner circumference surface of the cylindrical portion, the second valve seating surface is provided. Then, the flange portion is constituted to be supported by the large-diameter second bellows unit, and therefore, the second valve seating surface and second valve portion surface forming the second poppet valve can certainly be closed even when the valve body is supported only by the first bellows unit. For this reason, the operation surface of the valve body and valve seat body has no sliding surface, and the valve body shows pressure control, resulting in no sliding resistance but excellent response performance of the valve body.

Also preferably, in the control valve of the present invention, the first flow passage is formed as an annular space between the fuselage portion and the valve bore surface, and the first valve portion surface is a tapered surface toward the fuselage portion.

According to thus-constituted control valve, the fuselage portion between the first valve portion and second valve portion of the valve body is fitted with the valve bore surface so as to provide a space, and the first valve portion surface is formed to be a tapered surface, constituting the poppet valve, so that there is no sliding surface in the valve body. Therefore, the valve body can control the fluid with controlling pressure without sliding resistance when opening/closing. Also, since the valve body has no sliding surface, there is no increase in sliding resistance due to impurities. Therefore, the valve body can exhibit effects of excellent response performance and reliable control of the fluid with controlling pressure.

BEST MODE FOR CARRYING OUT THE INVENTION

Hereinafter, control valves of embodiments according to the present invention will be explained in detail based on drawings.

Figure 1:
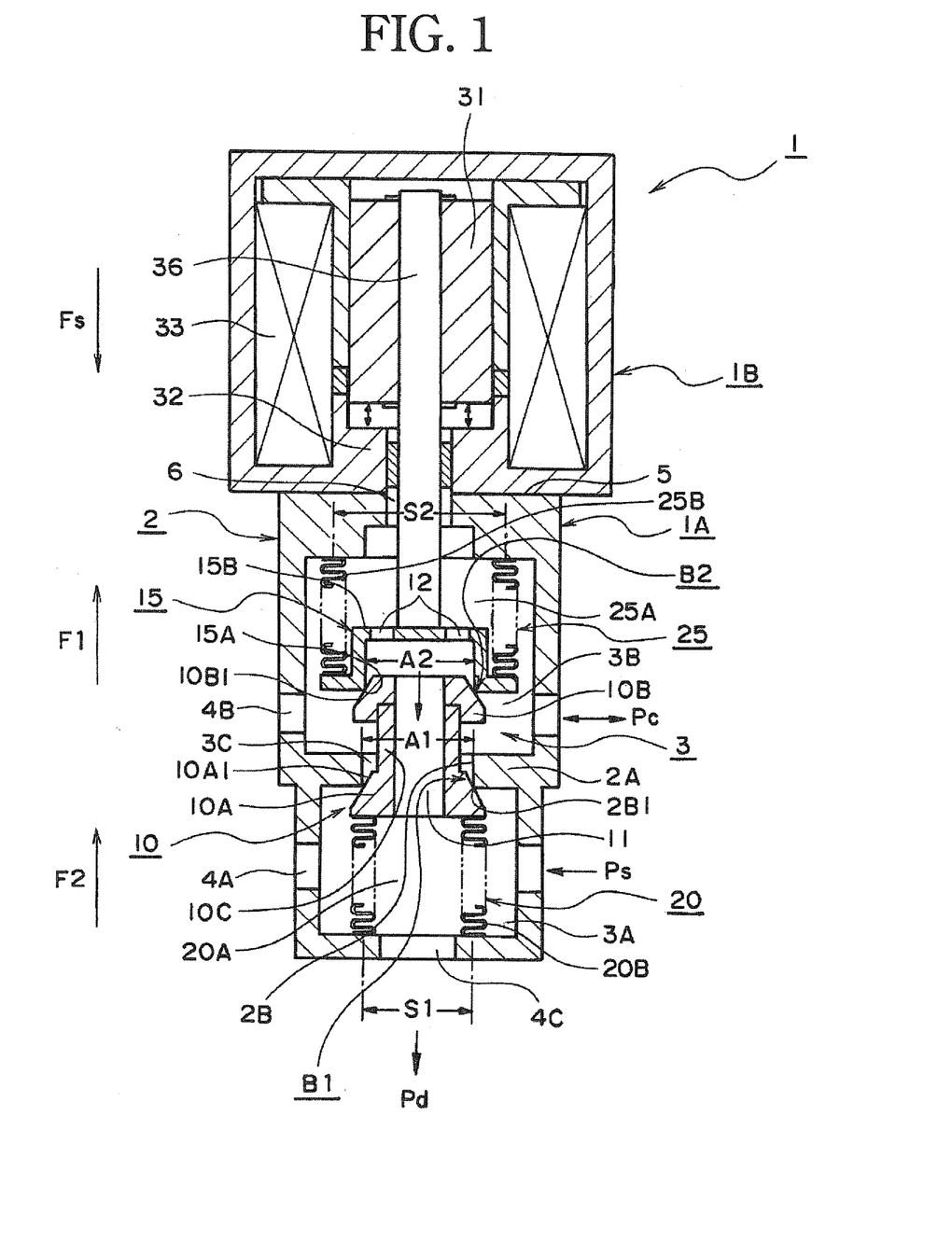
FIG. 1 is a full sectional view of a control valve according to a first embodiment of the present invention.

FIG. 1 is a sectional view of a control valve 1 showing a first embodiment according to the present invention. In FIG. 1, the control valve 1 is a pressure proportional control valve. This control valve 1 is integrally formed with a control valve portion 1A and a solenoid portion 1B. The control valve portion 1A forms an outer frame by a main body 2. The inside of the main body 2 is provided with a valve air chamber 3 having an axially-long shape. The valve air chamber 3 is divided by a partition portion 2A to form a first valve chamber 3A at one side of the partition portion 2A and a second valve chamber 3B at the other side. Further, the partition portion 2A is provided with a valve bore surface 2B in the surrounding surface of a valve bore penetrating the first valve chamber 3A and second valve chamber 3B at its axis. Also, a first valve seating surface 2B1 is formed in a corner portion of an end at the side of the first valve chamber 3A in the valve bore surface 2B. The main body 2 is made of metal such as iron, brass, copper, aluminum and stainless, synthetic resin material, etc.

Further, in the main body 2, a supply port 4A is penetrated from the outer circumference surface to the first valve chamber 3A, and a discharge port 4C is formed outwardly from the center of the first valve chamber 3A. Note that the multiple supply ports 4A may be provided along the direction of the outer circumference of the main body 2. Also, multiple output ports 4B penetrating from the outer circumference surface of the main body 2 to the second valve chamber 3B may be provided along the outer circumference surface. Further, the other end portion of the second valve chamber 3B of the main body 2 at the side of the solenoid portion 1B is provided with a through-hole 6 for a solenoid rod 36 axially penetrating. Further, in the end portion provided with the through-hole 6 of the main body 2, a mounting surface 5 to fit the solenoid portion 1B in is provided. Note that the supply port 4A allows a fluid with supply pressure Ps flowing in. Also, the output port 4B allows a fluid with controlling pressure Pc flowing out or in. Further, the discharge port 4C allows discharging a fluid with discharge pressure Pd.

A valve body 10 has a first valve portion 10A provided in one end of a fuselage portion 10C, and a second valve portion 10B connected to the other end for convenience of assembly. Note that the valve body 10 is made of metal such as brass, copper, aluminum and stainless, or synthetic resin material, etc. In the valve bore surface 2B, the fuselage portion 10C of the valve body 10 is arranged so as to provide hollow. A fitting hollow of the fuselage portion 10C and valve bore surface 2B is formed in a first flow passage 3C communicating to the supply port 4A.

The valve body 10 is formed with the first valve portion 10A integrated with the fuselage portion 10C at the side of the first valve chamber 3A of the fuselage portion 10C. The first valve portion 10A is provided with a first valve portion surface 10A1, which is tapered toward the fuselage portion 10C. The first valve portion surface 10A1 closes when getting into the valve bore surface 2B to joint with the first valve seating surface 2B1 in the form of linear contact, and opens when separating from the first valve seating surface 2B1. That is, the first valve portion surface 10A1 and first valve seating surface 2B1 constitute a first poppet valve B1. Note that the interior portion where the first valve portion surface 10A1 and first valve seating surface 2B1 joint is a first pressure receiving area A1 which receives pressure of the working fluid. When the first valve portion surface 10A1 opens with respect to the first valve seating surface 2B1, the fluid with supply pressure Ps is supplied from a flow passage at the side of the outer circumference of the first valve chamber 3A passing through the first flow passage 3C into the second valve chamber 3B. Also, in the second valve chamber 3B of the fuselage portion 10C, the second valve portion 10B integrated with the fuselage portion 10C is arranged. The second valve portion 10B is also provided with a second valve portion surface 10B1 which has a tapered surface toward its end. Also, in the valve body 10, a first communication passage 11 penetrating from the first valve portion 10A to the second valve portion 10B is formed.

Also, a first pressure-sensing device 20 arranged in the first valve chamber 3A is formed in a first bellows unit (hereinafter, simply referred to as a first bellows) 20B giving spring means by crinkling a cross-sectional surface of a cylindrical form. The inside is provided with a second communication passage 20A (first pressure-sensing device 20 is a collective term for the first bellows unit 20B; and in the present invention, the pressure-sensing device is equivalent to the bellows unit). In the first bellows 20B, an area receiving the pressure of the working fluid is a first effective pressure receiving area S1. Also, the spring means of the first bellows 20B is a compressed spring to press the valve body 10 toward the top, and its spring force is F2. The periphery of the other cylindrical end portion of the first bellows 20B is hermetically connected to the end portion of the first valve portion 10A so as to middle the first communication passage 11 and one end periphery is connected to the main body 2 so as to middle the discharge port 4C. It is preferable that an outer diameter of the end portion of the first valve body 10 has approximately same dimension with an outer diameter of the first bellows 20B connecting thereto. That is, the second communication passage 20A of the first bellows 20B communicates with the first communication passage 11 of the valve body 10 and also communicates with the discharge port 4C. Also, the spring force F2 of the first bellows 20B elastically presses the valve body 10 toward the solenoid portion 1B. Note that the first communication passage 11 allows communication between the inside of the second valve chamber 3B and the discharge port 4C when the second valve portion surface 10B1 separates from the second valve seating surface 15A of the valve seat body 15 to open.

Further, the valve seat body 15 is integrally formed with a bottomed cylindrical portion 15B loosely fitted to an inner circumference surface of a second bellows unit 25B in a side surface at the side of the inner circumference of a ring-shaped valve seat portion (hereinafter referred to as a flange portion). Note that it is not necessary to have a form as in FIG. 1 as long as the valve seat body 15 has a constitution which allows being connected to the solenoid rod 36 and forming the second valve seating surface 15A, and has a form to be connected to the second bellows unit 25B. For example, the valve seat body 15 may have a form that a cylindrical portion is provided in the side surface at the side of the inner circumference of the valve seat portion, and further, the valve seat body 15 may be a valve seat portion formed in a ring-shaped board. In a corner portion at the side of the second valve portion 10B in an inner circumference surface of the flange portion, the second valve seating surface 15A is formed. The second valve seating surface 15A closes and opens with regard to the second valve portion surface 10B1 of the second valve portion 10B to control the amount of flow of the fluid with controlling pressure Pc. The second valve portion surface 10B1 and second valve seating surface 15A constitute a second poppet valve B2 which opens/closes to joint in the form of linear contact. Note that an area receiving pressure by the working fluid (fluid with controlling pressure Pc) in the interior portion, where the second valve portion surface 10B1 and second valve seating surface 15A are jointed, is a second pressure receiving area A2. The bottomed cylindrical portion 15B of the valve seat body 15 is jointed to a bottom end portion of the solenoid rod 36, and the operation of the solenoid portion 1B allows opening/closing by contacting and discontacting the second valve seating surface 15A and second valve portion surface 10B1. Also, the bottomed cylindrical portion 15B is provided with a plurality of first internal passages 12, so as to introduce the working fluid from the first internal passage 12 to a second internal passage 25A provided in the second bellows 25B. At the same time, the first internal passage 12 always allows communicating the second internal passage 25A with the discharge port 4C. As a result, it maintains balance the pressure so as not to apply the pressure of the working fluid, which works on respective components at the side of the second internal passage 25A, in an off-balance manner only on one surface. Note that the first bellows 20B has not only a function as spring means but also a function of a second communication passage 20A to allow the working fluid flowing by communicating the first communication passage 11 and discharge port 4C.

Also, a second pressure-sensing device 25 is arranged between the flange portion of the valve seat body 15 in the second valve chamber 3B and the main body 2. The second pressure-sensing device 25 is a collective term for a second bellows unit (hereinafter simply abbreviated as a second bellows) 25B (in the present invention, the second pressure-sensing device is equivalent to the second bellows unit), which gives spring means by crinkling a cross-sectional surface of a cylindrical form and forms the second internal passage 25A in its circumference surface. The second bellows 25B is a stretch spring to pull the valve seat body 15 toward the solenoid portion 1B, and the spring force is F1. The periphery of the other cylindrical end portion of the second bellows 25B is loosely fitted to the bottomed cylindrical portion 15B to hermetically connect to the flange portion of the valve seat body 15, and one periphery is connected to the main body 2 so as to have the solenoid rod 36 as its axis and supported. The form of the valve seat body 15 is not limited to a bottomed cylindrical. For example, the solenoid rod 36 may be made biforked and connected to the above-mentioned cylindrical portion. Then, by the spring force F1 of the second bellows 25B, the valve seat body 15 is pulled to a direction to open from the valve body 10. Note that the second bellows 25B as the second pressure-sensing device 25 has not only a function as spring means but also a function of the second internal passage 25A to allow the working fluid flowing by communicating to other fluid passages.

The solenoid portion 1B, as described above, is jointed to the mounting surface 5 of the control valve portion 1A. The solenoid portion 1B is a conventionally-known structure applied to the operation of the control valve portion 1A, so that it will briefly be explained. The solenoid portion 1B is internally provided with a movable core 31, and the movable core 31 is connected to the solenoid rod 36. Also, a stationary core 32 is provided in an opposed position of the movable core 31. A magnet coil 33 is arranged in the outer circumferences of the movable core 31 and the stationary core 32 to configure electromagnetic circuit. When electric current is applied to the magnet coil 33, the movable core 31 is suctioned into the stationary core 32 by magnetic force generated in the electromagnetic circuit in response to the magnitude of electrical current. When the movable core 31 is suctioned, the solenoid rod 36 integrated with the movable core 31 moves forward to extend the second bellows 25B and to let the valve seat body 15 move forward. Simultaneously, when the valve seat body 15 moves, the valve seat body 15 presses the valve body 10 to move, making the first valve portion surface 10A1 separate from the first valve seating surface 2B1 to open. At this time, the first bellows 20B is compressed.

Figure 2:
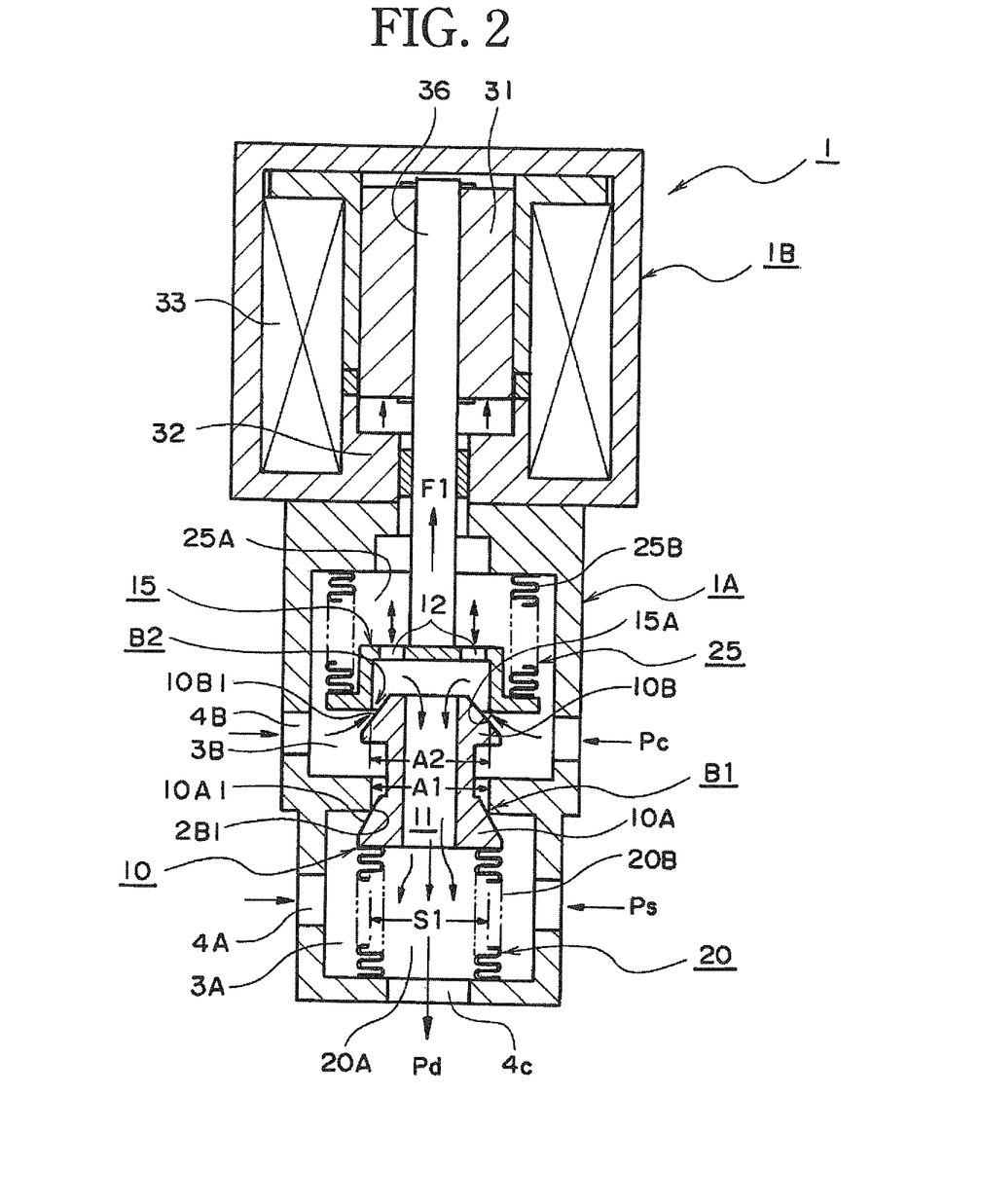
FIG. 2 is a full sectional view of a control valve showing the first operating condition of the control valve in FIG. 1.

Next, the operating condition of the control valve 1 will be explained based on FIG. 1, FIG. 2 and FIG. 3. The control valve 1 shown in FIG. 2 has the same structure as shown with the same symbols as in the control valve 1 of FIG. 1. FIG. 2 shows operating condition of the control valve portion 1A when not applying electric current to the solenoid portion 1B. The operating condition of opening/closing of the first poppet valve B1 and second poppet valve B2 of FIG. 2 is as shown in FIG. 2. Namely, the movable core 31 and the stationary core 32 are separatable since there is no magnetic field working between the movable core 31 and the stationary core 32. Simultaneously, the valve seat body 15 is moved toward the solenoid portion 1B by the elastic recoil "F1" (see FIG. 1) of the second bellows 25B. Also, the second valve seating surface 15A separates from the second valve portion surface 10B1. The second poppet valve B2 formed by the second valve portion surface 10B1 and the second valve seating surface 15A is in the state of opening, so that the flow of fluid between the second valve chamber 3B and first communication passage 11 opens. Then, when the second poppet valve B2 opens, for example, a working fluid for a hydraulics brake of an automatic transmission (fluid with controlling pressure Pc) which is not indicated in the drawings can be discharged from the second valve chamber 3B to the discharge port 4C through the first communication passage 11. Namely, when stopping the solenoid portion 1B, the fluid with controlling pressure Pc can be stopped. Also, when the second poppet valve B2 opens, the pressure of the second internal passage 25A becomes equivalent to that of the second valve chamber 3B through the first internal passage 12. Therefore, the valve seat body 15 forms a flow passage between the second valve portion surface 10B1 and second valve seating surface 15A by the elastic recoil of the second bellows 25B designed to have larger diameter than the first bellows 20B, and the degree of opening valve to form the flow passage can be quickened by elastic recoil of the second bellows 25B.

At the same time of the opening of the second poppet valve B2, the valve body 10 is pressed by elastic tensile stress "F2" (see FIG. 1) of the first bellows 20B to allow the first valve portion surface 10A1 jointing with the first valve seating surface 2B1. Then, the first poppet valve B1 formed by the first valve portion surface 10A1 and the first valve seating surface 2B1 closes. Therefore, the fluid with supply pressure Ps supplied from the supply port 4A grows stagnant in the flow passage at the side of the outer circumference of the first bellows 20B since the fluid with supply pressure Ps is blocked by the first poppet valve B1, resulting in preventing it from flowing into the second valve chamber 3B through the first flow passage 3C.

Figure 3:
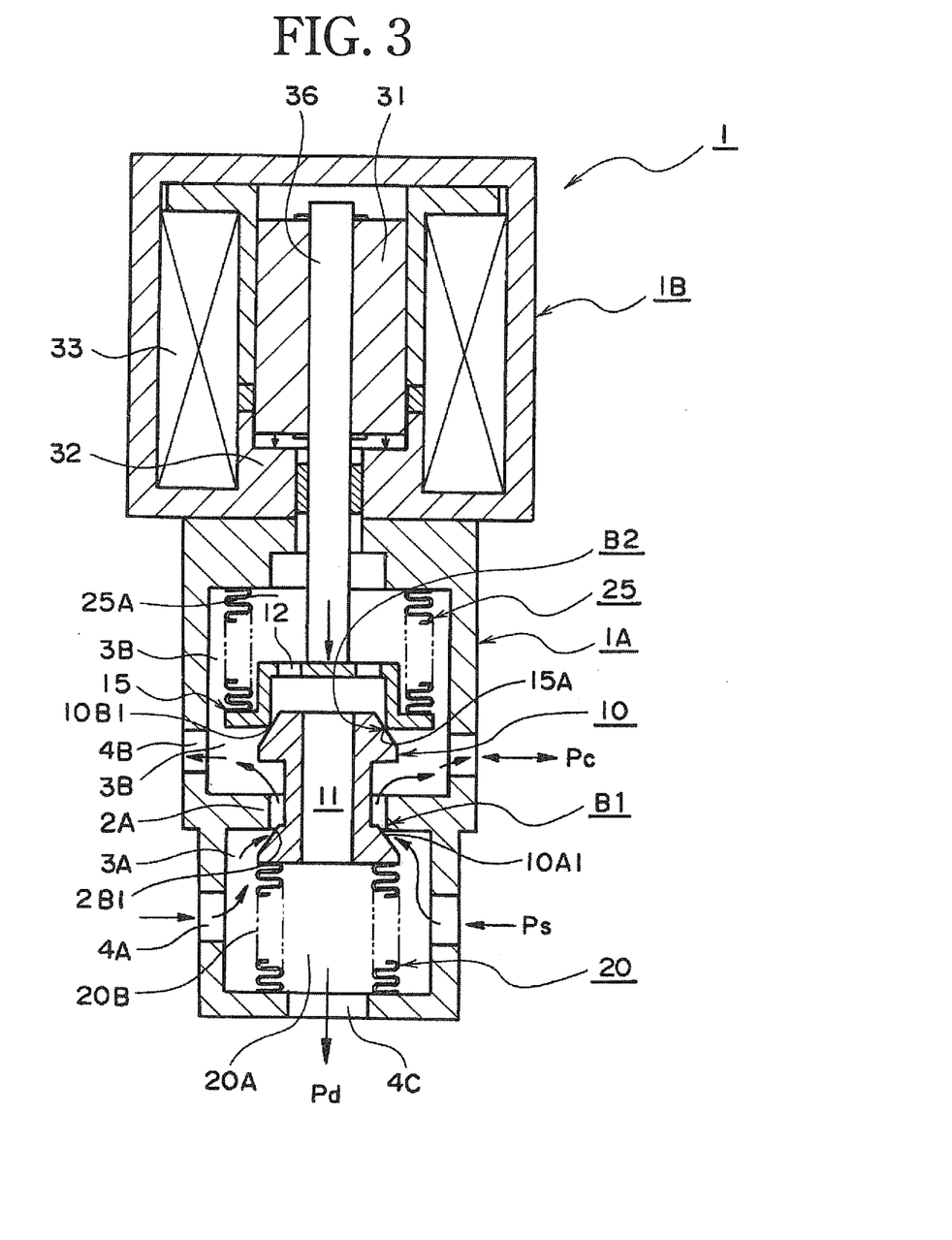
FIG. 3 is a full sectional view of a control valve showing the second operating condition of the control valve in FIG. 1.

A control valve 1 shown in FIG. 3 has the same structure as shown with the same symbols as in the control valve 1 of FIG. 1. In FIG. 3, larger electric current is applied to the solenoid portion 1B compared to the operating condition of the control valve 1 in FIG. 1. In this case, the operating condition of opening/closing by the first poppet valve B1 and second poppet valve B2 is as shown in FIG. 3. Namely, the movable core 31 and the stationary core 32 further come closer since the magnetic field is greatly worked between the movable core 31 and the stationary core 32. Then, the solenoid rod 36 connecting to the movable core 31 elastically extends the second bellows 25B (see FIG. 1) and simultaneously allows moving the valve seat body 15 toward the valve body 10. The second valve seating surface 15A then is jointed to the second valve portion surface 10B1 to make the second poppet valve B2 close. Therefore, the flow of the fluid between the second valve chamber 3B and first communication passage 11 is blocked, so that the fluid with controlling pressure Pc running in the output port 4B is prevented from flowing out toward the discharge port 4C.

Simultaneously, the first poppet valve B1 opens, and therefore, fluid with supply pressure Ps supplied from the supply port 4A runs in flow passage at the side of the outer circumference of the first bellows 20B, and further runs through the first flow passage 3C, opened between the first valve seating surface 2B1 and the first valve portion surface 10A1, into the second valve chamber 3B. Then, it makes the amount of flow of the fluid with controlling pressure Pc increase at the side of the output port 4B, for example, in the hydraulics brake. The fluid with supply pressure Ps from the supply port 4A flows into the first valve chamber 3A. In the connection between the valve body 10 and first bellows 20B in the first valve chamber 3A, the other end periphery of the first bellows 20B is jointed so as to surround the surface of the end portion or step-like surface of outer circumference of the end portion of the valve body 10. Then, even when the fluid with supply pressure Ps acts on the valve body 10 in the first valve chamber 3A, it is possible to prevent working unbalanced force onto the valve body 10 since the first pressure receiving area A1 and first effective pressure receiving area S1 are nearly equally formed in size. Therefore, even when the fluid with supply pressure Ps supplied from hydraulic pump fluctuates, the valve body 10 is effectively prevented from fluctuating (pulse) due to the supply pressure Ps, and the degree of opening/closing of the first poppet valve B1 is operated as set up. Also, respective valve portions 10A and 10B of the first valve body 10 take poppet form, the first bellows 20B takes a cylindrical form with wavy cross-sectional surface, and at the side of its inner and outer circumference surfaces, a flow passage with the second communication passage 20A is formed, which is not constituted to slide with the corresponding sliding components as in prior arts. Therefore, even when the fluid with supply pressure Ps contains impurities such as fine powder and these impurities adhere to the valve body 10, it does not raise a problem. Therefore, the valve body 10 can work for the opening/closing as set up without causing malfunction due to impurities such as fine powder in the working fluid.

FIG. 1 shows the intermediate operating condition between the operating conditions of the control valve 1 in FIG. 2 and control valve 1 in FIG. 3. The operating condition of the control valve 1 in FIG. 1 indicates one embodiment of the opening/closing of the valve body 10 in which electric current runs in the solenoid portion 1B is smaller than that in the operating condition of the control valve 1 shown in FIG. 3 and controlled electric current is running. In this case, in the operating condition of the closing of the second poppet valve B2, the first poppet B1 is controlled to open/close in response to electric current running through the solenoid portion 1B. Also, the second poppet valve B2 opens/closes by a balance between thrust force of the solenoid portion 1B and forces due to controlling pressure Pc working onto the area of difference between the first effective pressure receiving area S1 and second effective pressure receiving area S2, so that the fluid with controlling pressure Pc is controlled. Then, the movable core 31 by the force of suction depending on electric current is controlled in the distance with the stationary core 32, and the solenoid rod 36 integrated with the movable core 31 is moved in response thereto. The valve seat body 15 connecting to the solenoid rod 36 elastically elongates and contracts the second bellows 25B to be jointed with the second valve portion 10B in the state of closing, resulting in moving the valve body 10 in response. The moving of the valve body 10 causes to disconnect the first valve portion surface 10A1 from the first valve seating surface 2B1 to control the degree of opening/closing of the first poppet valve B1. Therefore, by controlled opening/closing of the first poppet B1, fluid with supply pressure Ps flowing from the first valve chamber 3A to the second valve chamber 3B is controlled to flow as set up.

The structure in which the control valve 1 achieves pressure proportional control of the controlling pressure Pc by the solenoid portion 1B will be explained. In this control valve 1, a formula for balancing the force of the control valve portion 1 when the first poppet valve B1 and second poppet valve B2 close as shown in FIG. 1 is as follows.

In the following formula,
Fs is thrust force of the solenoid portion 1B,
F2 is biasing force of the first bellows 20B,
F1 is biasing force of the second bellows 25B,
S1 is the first effective pressure receiving area of the first bellows 20B,
S2 is the second effective pressure receiving area of the second bellows 25B,
A1 is the first pressure receiving area in the closed joint surface of the first poppet B1,
A2 is the second pressure receiving area in the closed joint surface of the second poppet B2,
Ps is supply pressure, and
Pc is controlling pressure,
where S1=A1=A2=St.

$$Fs-Pc(S2-A2)-F1-Pc(A2-A1)+Ps(S1-A1)-F2=0 \quad \text{[formula 1]}$$

In other word, the formula 1 is: Fs−Pc(S2−St)−F1−F2=0
The formula can further be converted to: Pc=(Fs−F1−F2)/(S2−St).

Therefore, the control valve 1 allows operating the valve body 10 by the thrust force Fs of the solenoid portion 1B to achieve the pressure proportional control of the controlling pressure Pc. Also, the control valve 1 enables to easily change pressure proportional control depending on machine by changing the thrust force F1 of the second bellows 25B and the area of difference between the first effective pressure receiving area S1 and second effective pressure receiving area S2.

In the pressure proportional control by the conventional control valve, it is difficult to control pressure as set up when sliding resistance is raised at the operation of the valve body. However, in the control valve 1 of the present invention, no sliding surface is provided for sliding at the operation of the valve body 10, first bellows 20B, second bellows 25B and valve seat body 15. Namely, in the valve body 10, the first poppet valve B1 and the second poppet B2 are jointed, which is almost linear contact, and other corresponding surfaces do not slide. In addition, the first poppet valve B1 and second poppet B2 are poppet valves, not spool types, so that it is possible to effectively prevent from increasing sliding resistance by adhering impurities such as fine powder onto the contacting surfaces. Also, the first bellows 20B and second bellows 25B are cylindrical bellows having a wavy cross-sectional surface and move in concert with the valve body 10 by axially and elastically elongating and contracting, and their inner circumference sides and outer circumference sides are flow passages for the fluid, so that no fitting surface is required when elastically dislocating. Therefore, even when the working fluid contains impurities such as fine powder, the valve body 10 can be prevented from causing a malfunction. Also, in the first bellows 20B, it is possible to prevent the valve body 10 from fluctuating when opening/closing since the force received from the supply pressure Ps to the direction of operation is canceled.

Further, for the pressure condition in which the working fluid works on the valve body 10 in the operation of the control valve 1, the pressure received from the supply pressure Ps to the valve body 10 is cancelled each other with respect to the direction of operation since the first effective pressure receiving area S1 of the first bellows 20B, the first pressure receiving area A1 in the joint surface (in the seal surface) of the first poppet valve B1 and the second pressure receiving area A2 in the joint surface (in the closed seal surface) of the second poppet valve B2 are uniformly constituted. Therefore, the valve body 10 has no thrust force received from the supply pressure Ps. Therefore, it is possible to operate the valve body 10 without receiving unnecessary force. On the other hand, the second effective pressure receiving area S2 of the second bellows 25B is formed to be larger than the first effective pressure receiving area S1 of the first bellows 20B, so that there is controlling pressure Pc working onto the pressure receiving area based on the difference in area between the first effective pressure receiving area S1 of the first bellows 20B and second effective pressure receiving area S2 of the second bellows 25B. Then, it exhibits an effect to open/close the second poppet valve for pressure controlling by a balance between a force of the controlling pressure Pc received in the difference in the pressure receiving area and the thrust force depending on electric current flowing in the solenoid portion 1B.

Figure 4:
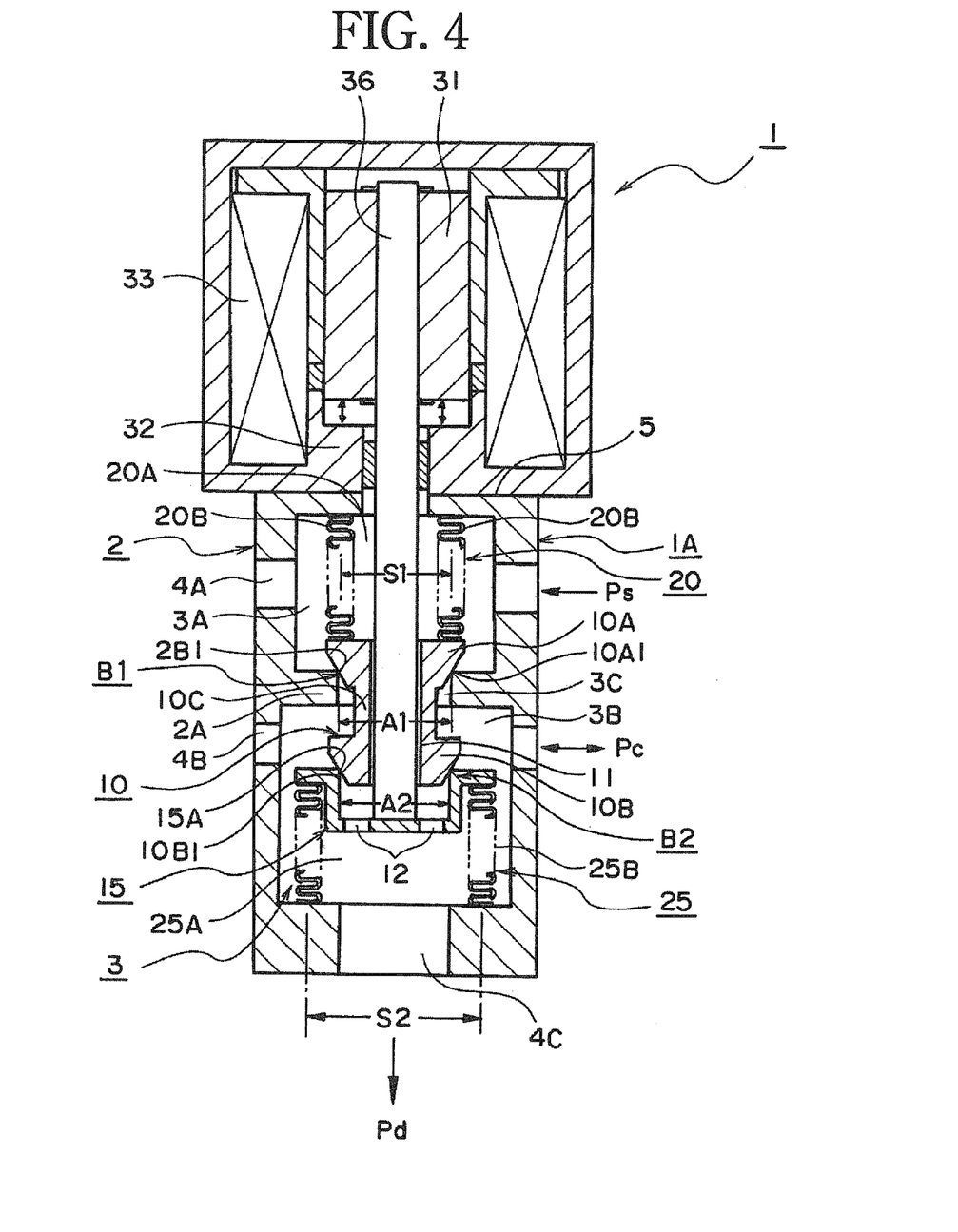
FIG. 4 is a full sectional view of a control valve according to a second embodiment of the present invention.

Next, FIG. 4 is a full sectional view of a control valve 1 of an embodiment 2 according to the present invention. In the control valve 1 of FIG. 4, a solenoid portion 1B is approximately same as in FIG. 1, and a control valve portion 1A is the same invention but is partially changed its structure. Namely, the change in structure of the control valve portion 1A is to provide a first valve chamber 3A of a main body 2 at the side of the solenoid portion 1B and to provide the second valve chamber 3B at the side of a discharge port 4C. Also, in the second valve chamber 3B, a second bellows 25B and a valve seat body 15 are arranged. Further, in the first valve chamber 3A, a first bellows 20B is arranged. Then, a valve body 10 is oppositely placed with respect to FIG. 1 to connect a first valve portion 10A and first bellows 20B, and also, a second poppet valve B2, formed by a second valve portion surface 10B1 of the second valve portion 10B and a second valve seating surface 15A of the valve seat body 15, is arranged so as to open/close in the second valve chamber 3B. Note that the valve seat body 15 is arranged opposite to the valve seat body 15 of FIG. 1. Also, a solenoid rod 36 intrudes into a first communication passage 11 of the valve body 10, and connects its apical end with the valve seat body 15. Then, the valve seat body 15 and second bellows 25B can work in response to the operation of the solenoid rod 36.

Also, the first effective pressure receiving area S1 of the first bellows 20B, the first pressure receiving area A1 of the first poppet valve B1 and the second pressure receiving area A2 of the second poppet valve B2 are made to have an equivalent area. Further, the second effective pressure receiving area S2 of the second bellows 25B is made to be larger than the first effective pressure receiving area S1 of the first bellows 20B. Then, the first bellows 20B is constituted to be an elastic compress form. The second bellows 25B is also constituted to be an elastic compress form. Other constitution is approximately same as the control valve 1 in FIG. 1. FIG. 4 shows the position at operation corresponding to that of FIG. 1, and other operations are same as in the control valve 1 described based on FIG. 2 and FIG. 3. Namely, in this control valve, the maximum flow of electric current in the solenoid portion 1B induces to open the second poppet valve B2. The present invention prevents discharging working fluid with controlling pressure Pc from the system to be controlled by the control valve 1 regardless of the type of systems when electric current does not flow through the solenoid valve 1B. Conversely, when electric current flows in the solenoid valve 1B, it is possible to discharge the working fluid with controlling pressure Pc from the system. Also, pressure proportional control of the control valve 1 is possible depending on magnitude of electrical current flowing in the solenoid valve 1B, and the difference in area between the first effective pressure receiving area S1 and second effective pressure receiving area S2. Also, the embodiment 2 shows same effects as described in the above first embodiment.

INDUSTRIAL APPLICABILITY

As described above, the control valve of the present invention is useful as a control valve for a fluid running through a hydraulic pressure system of an automobile and hydraulic pressure/pneumatic system such as power transmission device. Particularly, the control valve is useful as a control valve which is inexpensive and shows no malfunction.

The invention claimed is:

1. A control valve for controlling pressure of a working fluid, comprising
    a main body internally having a first valve chamber and a second valve chamber and having a first valve seating surface provided on a surrounding surface of a valve bore surface at a side of said first valve chamber, the valve bore surface being penetrating a partition portion provided between said first valve chamber and said second valve chamber;
    a supply port penetrating said main body to communicate to said first valve chamber and flowing a fluid with supply pressure;
    an output port penetrating said main body to communicate said second valve chamber and flowing a fluid with controlling pressure;
    a first bellows unit arranged in said first valve chamber and having a spring means of a cylindrical body, a periphery of one end of the cylindrical body being hermetically connected with the main body, and a second communication passage being formed in an inner side of said cylindrical body;
    a discharge port penetrating said main body to communicate to said second communication passage and flowing a fluid with discharge pressure;
    a valve body having
        a first valve portion surface connecting to a periphery of another end of said cylindrical body of said first bellows unit to communicate said second communication passage to a first communication passage formed in the valve body at one end of the valve body, the first valve portion surface being contacting and discontacting with said first valve seating surface to configure a first poppet valve,
        a fuselage portion movably arranged in said valve bore surface and forming a first flow passage communicatable with said supply port between said valve bore surface and said fuselage portion, and
        a second valve portion surface formed integral with said fuselage portion and arranged in said second valve chamber;
    a valve seat body having
        a second valve seating surface provided in a corner portion of an inner circumference surface facing to the second valve portion surface of said valve body to constitute a second poppet valve by contacting and discontacting the second valve seating surface with said second valve portion surface, and
        a first internal passage in said inner circumference surface communicatable with said first communication passage;
    a second bellows unit arranged in said second valve chamber and having a spring means of a cylindrical body, an end periphery of the cylindrical body being connected with the main body, the other periphery of the cylindrical body being hermetically connected with said valve seat body, and the second bellows unit being provided with a second internal passage communicatable with said first internal passage; and a solenoid portion having a solenoid rod passing through said second internal passage to connect with said valve seat body, and moving said solenoid rod according to a magnitude of an electrical current; wherein a first effective pressure receiving area of said first bellows unit, a first pressure receiving area which receives fluid pressure in an interior portion in which said first valve seating surface and the first valve portion surface are jointed and a second pressure receiving area which receives fluid pressure in an interior portion in which said second valve seating surface and the second valve portion surface are jointed are nearly equally formed, and a second effective pressure receiving area of said second bellows unit is formed to be larger than said first effective pressure receiving area.

2. The control valve as set forth in claim 1 wherein said second bellows unit comprises the spring means pressing said valve seat body to said valve body, and said solenoid portion is constituted to move said solenoid rod in a direction away from said valve body according to the magnitude of said electrical of electrical current to open said valve seat body with respect to said second valve portion when applying said electrical current to said solenoid portion and to close said valve seat body with regard to said second valve portion when blocking said electrical current to said solenoid portion.

3. The control valve as set forth in claim 1 or 2, wherein said valve seat body has a cylindrical portion at a side surface of an inner circumference of said valve seat body, and said cylindrical portion is loosely fitted with an inner circumference surface of said second bellows unit.

4. The control valve as set forth in claim 1, wherein said first flow passage is formed as an annular space between said fuselage portion and said valve bore surface, and the first valve portion surface is tapered toward said fuselage portion.

5. The control valve as set forth in claim 2, wherein said first flow passage is formed as an annular space between said fuselage portion and said valve bore surface, and the first valve portion surface is tapered toward said fuselage portion.

6. The control valve as set forth in claim 3, wherein said first flow passage is formed as an annular space between said fuselage portion and said valve bore surface, and the first valve portion surface is tapered toward said fuselage portion.

* * * * *